United States Patent
Omaru et al.

(10) Patent No.: US 6,623,888 B1
(45) Date of Patent: Sep. 23, 2003

(54) NON-AQUEOUS ELECTROLYTE SECONDARY CELL

(75) Inventors: Atsuo Omaru, Fukushima (JP);
Naoyuki Nakajima, Fukushima (JP);
Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/564,078

(22) PCT Filed: Apr. 7, 1995

(86) PCT No.: PCT/JP95/00694
§ 371 (c)(1),
(2), (4) Date: Aug. 15, 1997

(87) PCT Pub. No.: WO95/28011
PCT Pub. Date: Oct. 19, 1995

(30) Foreign Application Priority Data

Apr. 8, 1994 (JP) .......................................... P6-071132

(51) Int. Cl.$^7$ ................................................ H01M 4/58
(52) U.S. Cl. .................................................. 429/231.8
(58) Field of Search ............................ 429/231.4, 231.8

(56) References Cited

U.S. PATENT DOCUMENTS

| | | | | |
|---|---|---|---|---|
| 3,856,574 A | * | 12/1974 | Amagi et al. ............. | 429/231.8 |
| 5,851,697 A | * | 12/1998 | Iijima et al. .............. | 429/231.8 |
| 6,106,976 A | * | 8/2000 | Ozaki et al. ......... | 429/231.8 X |

FOREIGN PATENT DOCUMENTS

| | | | |
|---|---|---|---|
| EP | A-0 573 266 | | 12/1993 |
| JP | 02-082466 | * | 3/1990 |
| JP | 02-284354 | * | 11/1990 |
| JP | 02-315481 | * | 11/1990 |
| JP | 04-110357 | * | 4/1992 |
| JP | 04-190557 | * | 7/1992 |
| JP | 05-036413 | * | 2/1993 |

* cited by examiner

Primary Examiner—Stephen Kalafut
(74) Attorney, Agent, or Firm—Sonnenschein, Nath & Rosenthal LLP

(57) ABSTRACT

A non-aqueous lithium salt secondary battery includes an anode consisting of carbon material in which doping/undoping of lithium is permitted, a cathode, and a non-aqueous electrolyte in which lithium salt is dissolved in a non-aqueous solvent. The carbon material constituting the anode is crushed graphite material having true density of 2.1 g/cm$^3$ or more and bulk density of 0.4 g/cm$^3$ or more. It is necessary that the graphite material is powder having in which an average value of shape parameters indicated by the following expression is 125 or less:

x=(L/T)·(W/T)

x: shape parameter

T: thickness of the portion thinnest in thickness of the powder

L: length in a length axis direction of the powder

W: length in a direction perpendicular to the length axis of the powder. Moreover, the graphite material is adapted so that the specific area is 9 m$^2$/g or less, and, in the grain size distribution determined by the laser diffraction method, the accumulated 10% particle diameter is 3 μm or more, the accumulated 50% particle diameter is a 10 μm or more, and the accumulated 90% particle diameter is 70 μm or less. Such graphite material powder is obtained by crushing the graphitized molding material obtained by allowing the carbon molding material to undergo heat treatment so that it is graphitized. An average of breaking strength values of particles of graphite material is caused to be 58.84 N/mm$^2$ (6.0 Kg f/mm$^2$) or more.

8 Claims, 5 Drawing Sheets

NON-AQUEOUS ELECTROLYTE SECONDARY CELL

TECHNICAL FIELD

This invention relates to a non-aqueous electrolyte secondary battery, and more particularly to an improvement in anode material.

BACKGROUND ART

Hitherto, as a secondary battery of general use, secondary batteries of the aqueous solution system such as lead battery, nickel/cadmium battery, etc. were the main current. However, while these aqueous solution system secondary batteries are satisfactory to some extent with respect to the cycle characteristic, it cannot be said that they have the characteristics which are satisfactory in connection with the battery weight and/or the energy density.

On the other hand, in recent years, researches and developments of non-aqueous electrolyte secondary batteries using lithium metal or lithium alloy as anode are being extensively carried out. These batteries have excellent characteristics of high energy density, less self-discharge and light weight.

However, when charge/discharge cycle is repeatedly carried out, there is the drawback that lithium is crystal-grown in a dendrite form on the anode in charge and the lithium in the dendrite form reaches the cathode, leading to the internal short. This seriously impedes practical use thereof.

In view of the above, as a non-aqueous electrolyte secondary battery to solve such problems, the spot light of attention has been focused on non-aqueous electrolyte secondary battery using carbon material as the anode. This non-aqueous electrolyte secondary battery utilizes doping/undoping of lithium into portions between carbon layers as anode reaction. Even if the charge/discharge cycle is repeatedly carried out,-precipitation in dendrite form of lithium cannot be observed. As a result, such non-aqueous electrolyte secondary battery exhibits satisfactory charge/discharge cycle characteristic.

Meanwhile, various kinds of carbon materials are enumerated as carbon materials which can be used as anode material of the above-mentioned non-aqueous electrolyte secondary battery. The material which has been first put into practical use as anode material is a non-graphitic carbon, e.g., a graphitizable carbon such as a coke, a non-graphitizable carbon such as a glass like carbon having low crystallinity obtained carrying out heat treatment of organic material at a relatively low temperature. Non-aqueous electrolyte secondary batteries using anode constituted with such non-graphitizable carbon material and the non-aqueous electrolyte including propylene carbonate (PC) as major solvent have been already commercialized.

Further, in recent years, graphite materials of which crystal structure has been developed has been also able to be used. In the case of graphite materials, PC used as the major solvent would be decomposed by graphite materials. This constituted obstruction in use as the anode material. However, by employing ethylene carbonate (EC) having high stability against graphite materials as the major solvent, such a problem is eliminated. Thus, use as the anode material can be made.

Flaky graphite materials can be relatively easily obtained, and has been conventionally widely used as conductive agent for alkaline primary battery. This graphite materials has higher crystallinity and higher true density as compared to the non-graphitizable carbon material. Accordingly, if the anode is constituted by such flaky graphite, high electrode packing density can be obtained. Thus, the energy density of battery is enhanced. From this fact, it can be said that graphite material is greatly expected material as the anode material.

Meanwhile, the material characteristics of graphite material diversely vary in dependency upon the production process thereof, and characteristics as the anode material also vary followed by this.

In order to obtain high reliability non-aqueous electrolyte secondary batteries as the industrial product, graphite materials of fixed (uniform) characteristic must be selected as a matter of course. For this reason, various studies have been conducted with respect to material characteristic values which affect the characteristic as the anode material of the graphite material to be selected.

For example, because graphite material has high crystallinity, crystal structure parameters determined by the X-ray diffraction or the Raman spectrometry, etc. provide a clue for recognition of doping/undoping ability of lithium.

Moreover, true density determines the electrode packing density. Materials having higher true density are permitted to have higher electrode packing density. As described above, in the graphite materials, it is one of merits that the true density is higher than that of the non-graphitizable carbon material.

In addition, particle diameter and/or specific surface area are also effective material characteristic values for selection of materials excellent in the characteristic.

However, when graphite material selected only by the above-mentioned material characteristic values is used as the anode, there are instances where the cycle lifetime is extremely shorter than that of the battery using non-graphitizable carbon material as the anode. For this reason, further study of the material characteristics are being required.

DISCLOSURE OF THE INVENTION

An object of this invention is to provide a non-aqueous electrolyte secondary battery caused to have higher electrode packing density, higher energy density and long cycle lifetime so that high reliability can be obtained.

As a result of the fact that the inventors of this application have energetically conducted studies in order to attain the above-described object, they have obtained the findings that the cycle lifetime of the battery is caused to be shorter in the case where particularly bulky flaky graphite having high degree of flatness is used, and if graphite having high bulk density and relatively low degree of flatness is selected even in the case where graphite material is used as the anode, elongation of the cycle lifetime can be made.

Moreover, the inventors have obtained the finding that crushed graphite powder or graphite powder having a particular specific surface area is used, whereby the cycle lifetime can be further prolonged.

Further, the inventors have obtained the finding that the graphitized molding material obtained by allowing the carbon molding material to undergo heat treatment to graphitize it is crushed, whereby graphite powder having high bulk density and low degree of flatness can be easily obtained.

Furthermore, the inventors have obtained the finding that graphite powder having a specific grain (particle) size distribution is used, whereby initial failure can be reduced and elevation of the battery temperature in the abnormal state such as overcharge, etc. can be suppressed.

In addition, the inventors have obtained the finding that graphite powder having average value of particle breaking strength is used, whereby improvement in the drain capability can be made.

This invention has been completed on the basis of such findings. A non-aqueous electrolyte secondary battery including an anode consisting of carbon material in which doping/undoping of lithium is permitted, a cathode and a non-aqueous electrolyte in which electrolyte is dissolved in a non-aqueous solvent is characterized in that carbon material constituting the anode is crushed graphite material in which true density is 2.1 g/cm³ or more, and bulk density is 0.4 g/cm or more which is obtained by crushing a graphite raw material.

The graphite material is required to be powder in which average value of shape parameters x indicated by the following expression is 125 or less.

$$x=(L/T) \cdot (W/T)$$

x: Shape parameter
T: Thickness of the portion in which thickness is the thinnest of the powder
L: Length in length axis direction of the powder
W: Length in a direction perpendicular to the length axis of the powder.

Moreover, it is desirable that graphite material is powder having specific surface area of 9 m²/g or less.

Further, it is preferable that graphite material used has, in the grain size distribution determined by the laser diffraction method, the accumulated 10% particle diameter of 3 μm or more, the accumulated 50% particle diameter of 10 μm or more, and the accumulated 90% particle diameter of 70 μm or less.

Such graphite material powder can be obtained, e.g., by crushing the graphitized molding material obtained by allowing the carbon molding material to undergo heat treatment to graphitize it.

It is preferable that the average value of particle breaking strength of the graphite material is 58.84 N/mm² (6.0 kgf/mm²) or more.

On the other hand, as the cathode, there is enumerated lithium transition metal compound oxide expressed by general expression $LiMO_2$ (In this formula, M represents at least one of Co, Ni, Mn, Fe, Al, V and Ti), and as the non-aqueous electrolyte, there is enumerated the solution in which lithium salt is dissolved into a mixed solvent of cyclic carbonic ester and chain carbonic ester.

In this invention, as described above, there is used a graphite material of true density of 2.1 g/cm³ or more and bulk density of 0.4 g/cm³ or more as the anode material of the non-aqueous electrolyte secondary battery.

Since graphite material has high true density, when the anode is constituted by such graphite material, the electrode packing density is enhanced, so the energy density of the battery is improved.

Moreover when graphite material particularly having bulk density of 0.4 g/cm³ or more of graphite materials is used, for the reason why graphite material having great bulk density as described above can be relatively uniformly dispersed into anode depolarizing mix layer, or the like, the electrode structure becomes satisfactory. Thus, the cycle characteristic can be improved.

Similarly, when graphite material having low degree of flatness in which the bulk density is 0.4 g/cm³ or more and average shape parameter $x_{ave}$ is 125 or less is used, the electrode structure becomes more satisfactory. Thus, a longer cycle lifetime can be attained.

In order to obtain graphite material of this invention, it is preferable to employ a method of carrying out heat treatment for graphitization in the state where carbon is caused to be molded body. By crushing such graphitized molding material, graphite material having higher bulk density and small average shape parameter $x_{ave}$ can be made up.

Moreover, in the case where graphite powder in which the bulk density and the average shape parameter $x_{ave}$ are respectively within the above-mentioned ranges and the specific surface area is 9 m²/g or less is used, there result less fine particle of sub micron attached on the graphite particle, so the bulk density becomes high. Thus, the electrode structure becomes satisfactory, and the cycle characteristic is further improved.

Further, when there is used a graphite powder such that the accumulated 10% particle diameter is 3 μm or more, the accumulated 50% particle diameter is 10 μm or more, and the accumulated 90% particle diameter is 70 μm or less in the grain size distribution determined by the laser diffraction method, a non-aqueous electrolyte secondary battery of high safety and reliability can be obtained. The specific surface area of particles having small grain size becomes large. However, by limiting the content percentage thereof, it is possible to suppress extraordinary heat at the time of overcharge, etc. by particles of great specific surface area. Moreover, by limiting content percentage of particles of higher grain size, it is possible to suppress internal short followed by swelling (expansion) of particles at the time of initial charging. Thus, a practical non-aqueous electrolyte secondary battery having high safety and reliability can be provided.

Namely, in this invention, with respect to graphite material used as anode material of the non-aqueous electrolyte secondary battery, the bulk density, the average shape parameter $x_{ave}$, the specific surface area, the grain size distribution, the method of manufacturing graphite material powder, and the average value of particle breaking strength are limited. Accordingly, it is possible to acquire a non-aqueous electrolyte secondary battery which has high electrode packing density, can obtain anode satisfactory in the electrode structure, has high energy density, exhibits satisfactory cycle characteristic, has longer cycle lifetime, has high safety and reliability, has excellent drain capability, and has high reliability as the industrial product.

BEST MODE FOR CARRYING OUT THE INVENTION

Figure 1:
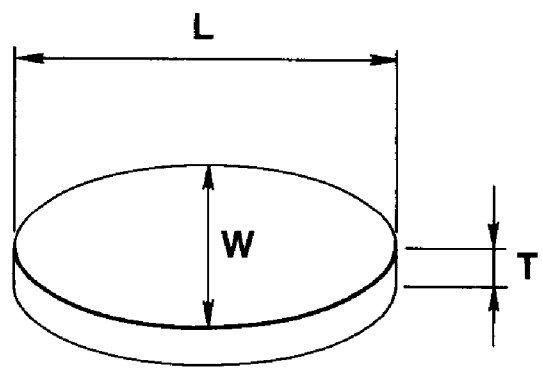
FIG. 1 is a model view showing an example of the representative shape of graphite carbon powder.

This invention is applied to a non-aqueous electrolyte secondary battery including an anode consisting of carbon material in which doping/undoping of lithium is permitted, a cathode and a non-aqueous electrolyte in which electrolyte is dissolved into a non-aqueous solvent.

In this invention, in such a non-aqueous electrolyte secondary battery, electrode packing density is enhanced to obtain high energy density, and graphite material having true density of 2.1 g/cm$^3$ or more and bulk density of 0.4 g/cm$^3$ or more is used as carbon material constituting the anode in order to obtain long cycle lifetime.

The reason why graphite material is used as the anode is that graphite material has high true density and is therefore advantageous in enhancing electrode packing density.

Accordingly, it is desirable that true graphite material has true density of 2.1 g/cm$^3$ or more in order to sufficiently obtain expected effect.

The true density of the graphite material is determined by the crystal structure thereof, and crystal structure parameters such as (002) spacing obtained by the X-ray diffraction method, C-axis crystallite thickness of the (002) plane, and G value in Raman spectrum serving as index of micro structure defect (ratio between area intensity of signal originating in graphite crystal structure and area intensity of signal originating in amorphous structure), etc. serve as index.

Namely, with respect to graphite material having true density of 2.1 g/cm$^3$ or more, (002) spacing obtained by the X-ray diffraction method is less than 0.34 nm, and C-axis crystallite thickness of the (002) plane is 14.0 nm or more. Moreover, G value in Raman-spectrum is 2.5 or more.

In order to obtain higher true density, it is desirable that the (002) spacing is less than 0.339 nm and the C-axis crystallite thickness of the (002) plane is 30.0 nm or more.

While graphite material as described above has high true density and is therefore suitable for enhancing electrode packing density, graphite powder has a unique shape like flake and is relatively bulky. When such shape conspicuously appears, this affects the electrode structure when anode is actually constituted. As a result, the cycle lifetime is lowered.

Namely, anode consisting of carbon material is made up, e.g., by dispersing carbon material powder and binder into an organic solvent to prepare an anode depolarizing mix to coat (paint) the anode depolarizing mix on the surface of a collector (electricity collecting body) to dry it. On the other hand, carbon material which is in flake form and is bulky has low dispersibility with respect to binder. The reason thereof will be considered below. Namely, since flaky graphite has high crystallinity, the number of surface functional groups is small, and wettability with respect to binder becomes poor. As a result, dispersibility becomes poor. For this reason, in an anode using such a carbon material, carbon materials exist in an uneven manner in the anode depolarizing mix layer, resulting in the state where they are easy to be peeled off. It is thus estimated that such a state causes the cycle lifetime to be short.

In view of the above, in this invention, an approach is employed to use, as graphite material, a graphite material having bulk density of 0.4 g/cm$^3$ or more. An anode constituted with graphite material having bulk density of 0.4 g/cm$^3$ or more has satisfactory electrode structure, and a phenomenon such that graphite material is peeled off from the anode depolarizing mix layer is difficult to occur. Accordingly, the long cycle lifetime can be obtained.

It is to be noted that the bulk density limited in this invention is a value determined by the method described in the Japanese industrial standards No. K-1469. While if there is used a graphite material in which this bulk density value is 0.4 g/cm$^3$ or more, sufficiently long cycle lifetime can be obtained, it is preferable to use graphite material having bulk density of 0.5 g/cm$^3$ or more and it is more preferable to use graphite material having bulk density of 0.6 g/cm$^3$ or more.

Moreover, in order to obtain longer cycle lifetime as compared to the above, it is desirable to use, as graphite material, powder in which the bulk density is in the above-mentioned range and average value of shape parameters indicated by the following expression (1) is 125 or less.

$$x=(L/T)\times(W/T) \qquad (1)$$

x: Shape parameter
T: Thickness of the portion in which thickness is the thinnest of the powder
L: Length in length axis direction of the powder
W: Length in a direction perpendicular to the length axis of the powder Namely, the representative shape of the graphite material powder has a shape of flat column or rectangular parallelopiped as indicated by the model view of FIG. 1 or 2. When thickness of the portion in which thickness is the thinnest of the graphite material powder is T, length of the portion in which length is the longest is L, and length in a direction perpendicular to the length axis corresponding to depth is W, product of values obtained by respectively dividing L and W by T is the shape parameter x. According as the shape parameter x becomes smaller, height with respect to the bottom surface becomes higher and the degree of flatness becomes smaller.

The electrode structure of an anode constituted with graphite material powder in which the bulk density is within the above-mentioned range, and average value of shape parameters x (hereinafter referred to as "average shape parameter $x_{ave}$") determined in this way is 125 or less becomes more satisfactory to such an extent that the degree of flatness of graphite material is limited to lower value. Thus, long cycle lifetime can be obtained.

It is to be noted that the average shape parameter $x_{ave}$ mentioned here refers to value determined by actual measurement as described below.

Initially, graphite powder samples are observed by using SEM (Scanning Electron Microscope). Thus, ten (10) powder samples such that length of the portion in which length is the longest is ±30% of the average particle diameter are selected. Then, shape parameters x are calculated by the above-mentioned expression (1) with respect to the respective selected ten powder samples to calculate its average value. The average value thus calculated is the above-mentioned average shape parameter $x_{ave}$. While if the average shape parameter $x_{ave}$ of the graphite powder is 125 or less, the above mentioned effect can be sufficiently obtained, it is preferable that the average shape parameter $x_{ave}$ is 115 or less, and it is more preferable that the average shape parameter $x_{ave}$ is 100 or less.

Moreover, in the case where graphite powder in which the bulk density and the average shape parameter $x_{ave}$ are respectively within the above-mentioned ranges and the specific surface area is 9 m$^2$/g or less is used as graphite material, it is possible to obtain longer cycle lifetime as compared to the above-mentioned case.

It is considered that fine particles of sub micron size attached on graphite particles affect lowering of the bulk density. Because the specific surface area is increased in the case where fine particles are attached, even if graphite powder of similar grain size is employed, employment of graphite powder of small specific surface area has less effect on fine particles and provides higher bulk density. As a result, longer cycle lifetime can be obtained.

It is to be noted that the specific surface area referred to here is value measured and determined by the BET method. While if the specific surface area of graphite powder is 9 $m^2/g$ or less, the above-mentioned effect can be sufficiently obtained, it is preferable that the specific surface area is 7 $m^2/g$ or less, and it is more preferable that the specific surface area is 5 $m^2/g$ or less.

In order to obtain higher safety and reliability as a practical battery, it is desirable to use graphite powder in which the accumulated 10% particle diameter is 3 $\mu$m or more, the accumulated 50% particle diameter is 10 $\mu$m or more, and the accumulated 90% particle diameter is 70 $\mu$m or less in the grain (particle) size distribution determined by the laser diffraction method.

In the case of graphite powder filled into the electrode, when a method of allowing the grain size distribution to have width makes it possible to efficiently carry out filling of the graphite powder. It is preferable to employ a grain size distribution closer to the normal distribution. It should be noted that there are instances where battery may be caused to run hot in any abnormal state such as overcharging; etc. In the case where a large number of particles of small particle diameter are distributed, exothermic temperature has a tendency to become higher. For this reason, it is not preferable that such a distribution is employed.

Further, in charging the battery, since lithium ions intercalated in graphite layers, crystallites are swollen by about 10%. Thus, they press the cathode or separator within the battery, resulting in the state where initial failure such as internal short, etc. is apt to take place at the time of initial charging. On the other hand, since in the case where a large number of large particles are distributed, occurrence rate of failure has a tendency to become higher. For this reason, employment of such a distribution is not preferable.

Accordingly, by using a graphite powder having a grain size distribution in which particles including particles of large particle diameter to particles of small particle diameter are mixed in well-balanced manner, it is possible to provide a practical battery having high reliability. While employment of a grain size distribution of which shape is closer to the normal distribution can efficiently carry out filling, it is desirable that the accumulated 10% particle diameter is 3 $\mu$m or more, the accumulated 50% particle diameter is 10 $\mu$m or more, and the accumulated 90% particle diameter is 70 $\mu$m or less in the particle size distribution determined by the laser diffraction method. Particularly, in the case where the accumulated 90% particle diameter is less than 60 $\mu$m, initial failure is greatly reduced.

Moreover, in order to improve the heavy drain capability as a practical battery, it is desirable that average value of particle breaking strength is 58.84 N/mm2 (6.0 kgf/mm$^2$) or more. Easiness of movement of ions at the time of discharge affects the drain capability. Particularly, in the case where many voids exist in the electrode, a sufficient quantity of electrolyte also exist, thus exhibiting satisfactory characteristic.

On the other hand, in the case of graphite material having higher crystallinity, graphite layers are developed in the a-axis direction, and crystallites of the c-axis are formed (made-up) by stacking of those graphite layers. Since bonding between graphite layers is weak bonding called van der Waals force, it is apt to be deformed with respect to stress. For this reason, in allowing particles of graphite powder to undergo compression molding to fill them into the electrode, they are more easily collapsed than carbonaceous material heat-treated at a low temperature. For this reason, it is difficult to maintain voids. Accordingly, according as particle breaking strength of graphite powder becomes higher, its graphite powder particle is more difficult to be collapsed, and voids are apt to be more easily produced. Thus, the drain capability can be improved.

It is to be noted that average value of particle breaking strength of graphite powder referred to here is a value determined by an actual measurement as described below. As a measurement apparatus for breaking strength, Shimazu Seisakusho Shimazu Micro Compression Testing Machine (MCTM-500) is used. Initially, graphite powder samples are observed by an optical microscope provided in association therewith to select ten (10) powder samples such that length of the portion in which length is the longest is ±10% of the average particle diameter. Then, weight is applied to the respective selected ten powder samples to measure particle breaking strength to calculate its average value. The average value thus calculated is an average value of particle breaking strength of graphite powder. In order to obtain satisfactory drain capability, it is preferable that the average value of particle breaking strength of graphite powder is 58.84 N/mm$^2$ (6.0 Kg f/mm$^2$) or more.

As long as graphite materials having bulk density, shape parameter x, specific surface area, grain size distribution, and particle breaking strength as described above are employed as graphite material of graphite powder, there may be employed either natural graphite, or artificial graphite produced by carbonizing organic material to further implement heat treatment thereto.

As an organic material serving as a starting material in producing the artificial graphite, coal and/or pitch are representative.

As pitch, there are tar family obtained by high temperature thermal decomposition such as coal tar, ethylene bottom oil, or crude oil, etc., pitch obtained by operation such as distillation (vacuum distillation, ordinary pressure distillation, steam distillation), thermal condensation polymerization, extraction, or chemical condensation polymerization, etc., and pitch produced at the time of timber distillation, etc.

Further, as the starting material serving as pitch, there are polyvinyl chloride resin, polyvinyl acetate, polyvinyl butylate, or 3,5-dimethylphenol resin, etc.

Such coal and pitch exist in a liquid state at a temperature of about 400° C. at the maximum in the middle of carbonization to hold them at that temperature, whereby aromatic rings are polycyclically condensed, resulting in the state where they are stacked and oriented. Thereafter, when temperature reaches about 500° C. or more, carbon precursor of solid, i.e., semi coke is formed. Such a process is called a liquid phase carbonization process, and is a typical production process of graphitizable carbon.

In addition, condensed polycyclic hydro carbon compound such as naphthalene, phenanthrene, antracene, triphenylene, pyrene, perylene, pentaphene, or pentacene, etc., other derivatives (e.g., carbonate, carboxylic anhydride, carboxylic imide thereof, etc.), or mixture thereof, condensed heterocyclic compound such as acenaphthylene, indole, isoindole, quinoline, isoquinoline, quinoxaline, phthalazine, carbazole, acridine, phenazine, phenanthridine, etc., and derivatives thereof may be used as material.

In order to produce a desired artificial graphite with an arbitrary one of the above mentioned organic materials being as the starting material, e.g., the selected organic material is carbonized at 300~700° C. in inactive gas flow such as nitrogen, etc. therafter to calcine the carbonized material under the condition of temperature elevation speed of 1~100° C./min, arrival temperature of 900~1500° C., and holding time of about 0~30 hours at the arrival temperature, etc. in inactive gas flow to further carry out heat treatment at 2000° C. or more, preferably at 2500° C. or more. It is a matter of course that carbonization or calcination may be omitted depending upon circumstances.

The graphite material thus produced is subjected to crushing (milling) and classifying, and is used for the anode material. This crushing may be carried out before and after carbonization or calcination, before and after high temperature heat treatment, or during temperature elevation process before graphitization. In this case, heat treatment for graphitization is carried out in powdered state as the final process.

Further, in order to obtain graphite material powder of high bulk density and high breaking strength, it is more desirable to allow the carbon molding material to undergo heat treatment to graphitize it so that graphitized molding material is provided to implement crushing/classifying thereto.

The graphitized molding material generally consists of one of coke and graphite powder serving as filler or mixed material thereof, and binder pitch as molding agent or sintering agent. These materials are mixed and the mixed material is molded. Thereafter, binder pitch is carbonized. Further, pitch is impregnated thereto to allow it to undergo carbonization and graphitization. Thus, the graphitized molding material is obtained. Moreover, material in which molding property and sintering property are rendered to filler itself is used, thus making it possible to obtain similar graphitized molding material.

The graphitized molding material is subjected to crushing and classifying after heat treatment, and is used as anode material. Since hardness of the molding itself is high, material of high bulk density and high breaking strength can be easily obtained as crushed powder.

Further, in order to obtain higher hardness, it is preferable to use coke as filler. Moreover, by adding, to the carbon molding material before graphitization, a small quantity of compound including element such as B, Na, Al, S, N, Ca, V, Si, etc., organic material such as glycerin or polyvinyl alcohol, etc., or high molecular material such as phenol resin, furan resin or cellulose system resin, etc., elevation of the degree of crystallization by heat treatment is suppressed. Thus, it becomes easy to obtain the graphitized molding material having higher hardness.

Further, since the graphitized molding material consists of coke serving as filler and binder pitch, it becomes polycrystal after graphitization, and the graphitized molding material is produced as gas at the time of heat treatment in the state where element such as sulfur or nitrogen is included in material. For this reason, such graphitized molding material includes micro voids as a route therefor, and lithium doping/undoping reaction as anode material is apt to be developed. In addition, there is also the merit that the processing efficiency is high from an industrial point of view.

On the other hand, material of cathode used in combination with an anode consisting of such a graphite material is not particularly limited. However, it is preferable that the cathode material includes sufficient quantity of Li. For example, compound metal oxide or Li consisting of lithium and transition metal expressed by general expression $LiMO_2$ (M indicates at least one of Co, Ni, Mn, Fe, Al, V and Ti), and/or interlayer compound including Li.

Particularly, since this invention aims at attaining high capacity, it is necessary that the anode includes Li corresponding to charge/discharge capacity of 250 mAh or more per graphite material 1 g of the anode in the steady state (after, e.g., about five (5) times of charge/discharge operations are repeated), it is desirable that the cathode includes Li corresponding to charge/discharge capacity of 300 mAh or more, and it is more preferable that the cathode includes Li corresponding to charge/discharge capacity of 330 mAh or more.

It is to be noted that it is not necessarily required that Li atoms are all delivered from the cathode. In short, it is sufficient that there exists Li corresponding to charge/discharge capacity of 250 mAh or more per graphite material 1 g within the battery. This Li quantity within the battery is determined by measuring discharge capacity of the battery.

In the non-aqueous lithium salt secondary battery of this invention, a-non-aqueous electrolyte in which lithium salt is dissolved in a non-aqueous solvent is used as the electrolyte.

Since graphite material is used for the anode in this invention, it is the premise that solvents except for PC are used as the main solvent of the non-aqueous solvent without use of propylene carbonate (PC) which may be decomposed by the graphite material. For example, as such a solvent, ethylene carbonate (EC) is suitable. Further, there may be employed compound of the structure in which halogen elements are substituted for hydrogen atoms of EC.

Moreover, with respect to compound which has reactive property with graphite material like propylene carbonate (PC), but is of the structure in which halogen elements are substituted for hydrogen atoms of ethylene carbonate (EC) as the main solvent, a very small quantity of second component solvent is substituted for a portion thereof. Thus, satisfactory characteristic can be obtained. As the second component solvent, propylene carbonate (PC), butylene carbonate, 1, 2-dimethoxyethane, 1, 2-diethoxy methane, γ-butyrolactone, valerolactone, tetrahydrofuran, 2-methyltetrahydoyrofuran, 1, 3-dioxolan, 4-methyl-1, 3-dioxolan, sulforan methyl sulforan, etc. may be used. It is preferable that quantity added thereof is less than 10 Vol %.

Further, in order to complete this invention, an approach may be employed such that, with respect to main solvent or mixed solvent of main solvent and second component solvent, a third solvent is added thereto to realize improvement in conductivity, suppression of decomposition of ethylene carbonate (EC) and improvement in low temperature characteristic, and to lower reactive property with lithium metal to improve safety.

As the third component solvent, chain carbonic ester such as DEC (diethyl carbonate) or DMC (dimethyl carbonate), etc. is suitable. Moreover, asymmetric chain carbonic ester such as MEC (methylethyl carbonate) or MPC (methyl propyl carbonate), etc. is suitable. It is preferable that mixing ratio of chain carbonic ester serving as the third component with respect to main solvent or mixed solvent of main solvent and second component solvent (main solvent or mixed solvent of main solvent and second component solvent: third component solvent) is 10:90~60:40 by volume ratio, and it is more preferable that the mixing ratio is 15:85~40:60 by volume ratio.

Further, as the third component solvent, mixed solvent of MEC and DMC may be employed. It is preferable that the mixing ratio of MEC-DMC mixed solvent is caused to fall within the range indicated by $1/9 \leq d/m \leq 8/2$ when MEC volume is m and DMC volume is d. Moreover, it is preferable that mixing ratio between main solvent or mixed solvent of main solvent and second component solvent and MEC-DMC mixed solvent serving as third component solvent is caused to fall within the range indicated by $3/10 \leqq (m+d)/T \leqq 7/10$ when MEC volume is m, DMC volume is d, and entire volume of the solvent is T.

As electrolyte dissolved into such a non-aqueous solvent, any solvents which can be used in batteries of this kind may be used, and they may be suitably mixed and used. For example, $LiPF_6$ is suitable. In addition, $LiClO_4$, $LiAsF_8$, $LiBF_4$, $LiB(C_8H_5)_4$, $CH_3SO_3Li$, $CF_3SO_3Li$, $LiN(CF_3SO_2)_2$, $LiC(CF_3SO_2)_3$, LiCl, LiBr, etc. may be used.

This invention will now be described in accordance with more practical embodiments. It is needless to say that this invention is not limited to these embodiments.

Embodiment 1

Initially, graphite powder used as anode material will be produced in a manner as described below.

After carbonaceous material powder obtained by calcining coal pitch coke at a temperature of 1200° C. is crushed, the carbonaceous material thus obtained is caused to undergo heat treatment at a temperature of 3000° C. in inactive gas atmosphere to produce artificial graphite material to further implement crushing and classifying thereto. Thus, graphite powder is obtained. True density, average particle diameter, bulk density, average shape parameter $x_{ave}$, capacity and capacity loss of the graphite powder thus obtained are shown in the Tables 1 and 2.

In this example, true density and average particle diameter are respectively measured by the pycnometer method and the laser diffraction method. The measurement methods for bulk density, average shape parameter $x_{ave}$, capacity and capacity loss will be described below in detail.

[Bulk Density Measurement Method]

The bulk density was determined by the method described in the Japanese industrial standards No. K-1469.

Namely, a measuring cylinder of volume 100 cm³ of which mass has been measured in advance is inclined to gradually throw sample powder 100 cm³ thereinto by using spoon. Then, the entire mass is measured by the minimum scale 0.1 g to subtract mass of the measuring cylinder from the mass thereof to thereby determine mass M of the sample powder.

Then, cork stopper is putted in the measuring cylinder into which the sample powder has been thrown to drop, fifty times, the measuring cylinder in that state from the height of about 5 cm with respect to a rubber plate. As a result, the sample powder in the measuring cylinder is compressed. Thus, volume V of the compressed sample powder is read. Then, bulk density (g/cm³) is calculated by the following expression (2).

$$D=M/V \quad (2)$$

D: Bulk density (g/cm³)
M: Mass (g) of sample powder in the measuring cylinder
V: Volume (cm³) of sample powder in the measuring cylinder after 50 times of falling operations

[Average Shape Parameter $x_{ave}$ Measuring Method SEM Measuring Method]

Figure 2:
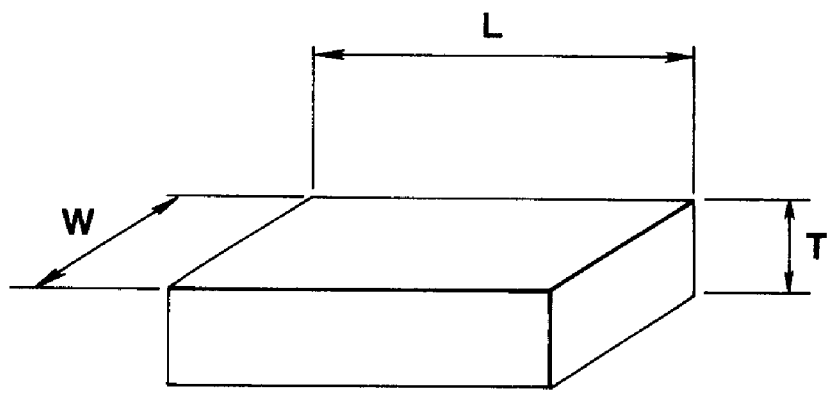
FIG. 2 is a model view showing another example of the representative shape of graphite material powder.

The representative shape of the graphite material powder has a shape of flat column or parallelopiped as indicated by the model view of FIG. 1 or 2. When thickness of the portion in which thickness is the thinnest of the graphite material powder is T, length of the portion in which length is the longest is L, and length in a direction perpendicular to the length axis corresponding to depth is W, product of values obtained by respectively dividing L and W by T is the above-mentioned shape parameter x. In practice, the graphite powder samples are observed by using SEM (Scanning Electron Microscope) to select ten (10) powder samples such that length of the longest portion is ±30% of the average particle diameter. Then, shape parameters are calculated with respect to the respective selected ten powder samples by the above-mentioned expression (1) to calculate its average value. The average value thus calculated is the above-mentioned shape parameter $x_{ave}$.

[Capacity and Capacity Loss Measuring Method]

With respect to measurement of capacity and capacity loss of graphite powder, test cells were made up to conduct such a measurement.

Initially, pre-heat treatment is implemented to the graphite powder under the conditions of elevation temperature speed of about 30° C./min., arrival temperature of 600° C. and arrival temperature holding time of 1 hour in Ar (gas) atmosphere. In this example, this pre-heat treatment is carried out immediately before preparation of anode mix indicated below.

Then, the graphite powder to which the pre-heat processing has been implemented, polyvinylidene fluoride corresponding to 10 weight % as binder and dimethyl formamide as solvent are mixed to dry it to prepare anode mix. Then, material of 37 mg of the anode mix thus prepared is subjected to weighing to mold it into pellet of diameter of 15.5 mm along with Ni mesh to make up a working electrode.

Then, the working electrode thus prepared is assembled into a test cell of the cell configuration as indicated below thus to measure capacity and capacity loss per carbon material 1 g. Configuration of the test cell Shape of the cell: coin type cell (diameter 20 mm, thickness 2.5 mm)

Opposite electrode: Li metal

Separator: Polypropylene porous film

Non-aqueous electrolyte: Solution in which $LiPF_6$ is dissolved into mixed solvent of EC and DEC (1:1 in terms of volume ratio) with a ratio of 1 mol/l.

It is to be noted that, in measurement of capacity and capacity loss, doping/undoping of lithium into carbon material (charge/discharge: Rigorously speaking, in this test method, the process where lithium is doped into carbon material is not charge but discharge, and the process where lithium is undoped is charge, but the doping process is called charge and the undoping process is called discharge for convenience in conformity with the actual condition at actual batteries) was conducted under the following conditions.

Charge Condition (Lithium Doping Condition):

A charge/quiescent (dormant) cycle such that after one hour charge is carried out at a constant current of 1 mA per cell, two hour quiescent state is maintained was repeatedly carried out until equilibrium potential estimated from the point of time=infinity of a graph given by plotting potential changes at the time of quiescent state with respect to $(time)^{-1/2}$ becomes equal to about 10 mV (Li/Li⁺).

Discharge Condition (Lithium Undoping Condition):

A charge/quiescent cycle such that after one hour charge is carried out at a constant current of 1 mA per cell, two hour quiescent state is maintained was repeatedly carried out with the terminal voltage 1.5 volts being as cut off voltage.

Capacity per carbon material 1 g was determined by conversion from discharge electricity quantity when charge/discharge is carried out under such condition.

Moreover, by subtracting discharge electricity quantity from charge electricity quantity, capacity loss was determined. In the case where charge/discharge is carried out under such condition, even if any carbon material is used, the discharge electricity quantity becomes a value smaller than the charge electricity quantity. This is because carbon material ordinarily has quantity of electricity which can be charged, but cannot be discharged. Here, the quantity of electricity which can be charged, but cannot be discharged is defined as capacity loss. This value of capacity loss is also important for evaluation of anode material.

Figure 3:
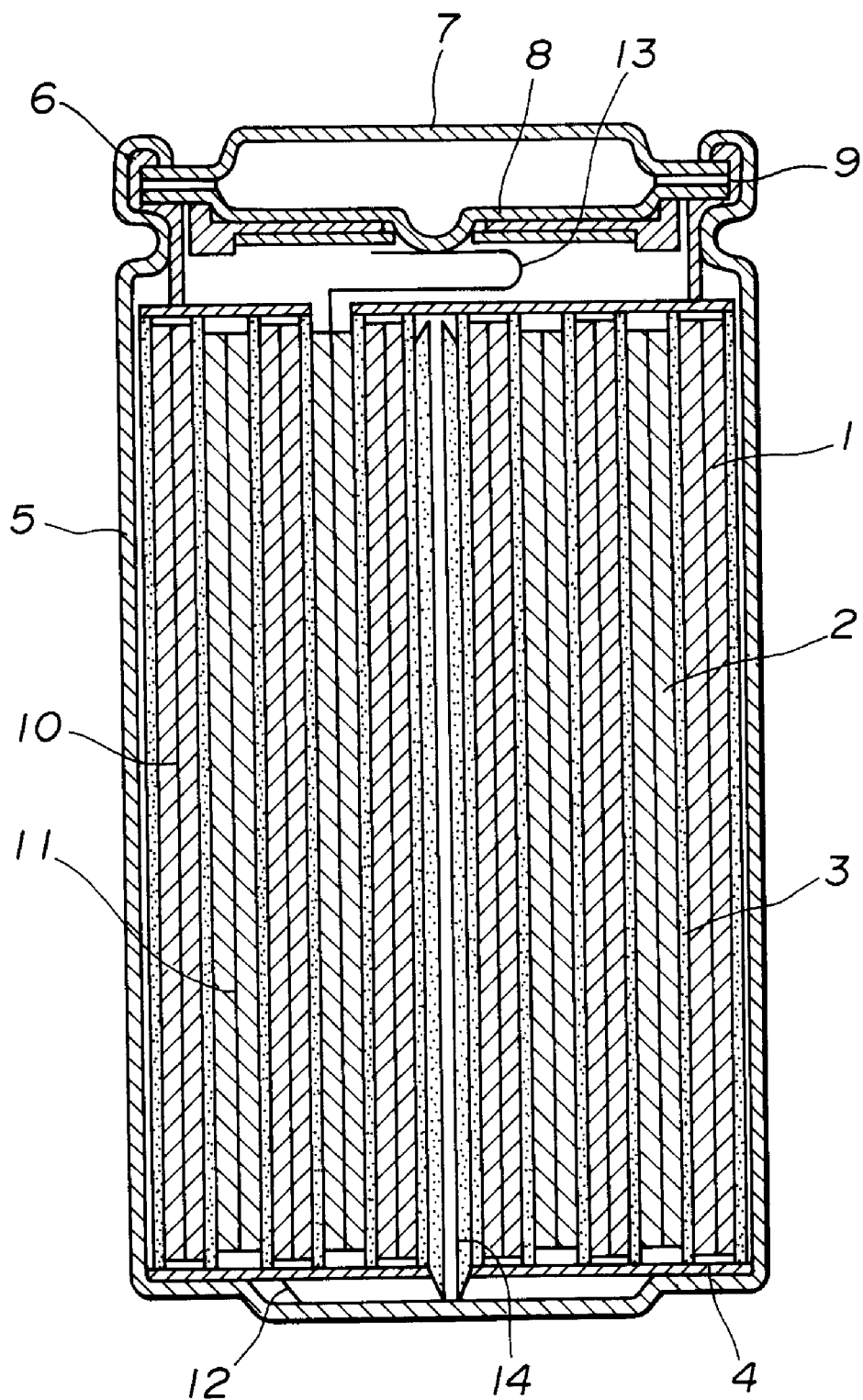
FIG. 3 is a schematic longitudinal cross sectional view showing an example of the configuration of a non-aqueous electrolyte secondary battery to which this invention is applied.

Then, twenty (20) non-aqueous electrolyte secondary batteries were actually prepared with the graphite powder of which various characteristics have been measured in a manner as described above being as the anode material to measure failure rate after initial charge, the cycle characteristic and maximum temperature at-the time of overcharge test. The configuration of the prepared battery is shown in FIG. 3.

An anode 1 was made up in a manner as described below.

The graphite powder 90 parts by weight and polyvinyledene (PVDF) 10 parts by weight as binder were mixed to prepare anode depolarizing mix to disperse it into N-methyl pyrolidone serving as solvent to allow it to be anode depolarizing mix slurry (in paste form).

Belt-shaped copper foil having thickness of 10 $\mu$m was used as an anode collector (electricity collecting body) 10 to paint the anode depolarizing mix slurry on the both surfaces of the collector to dry it thereafter to apply compression molding thereto by using a press machine of constant pressure, thus to make up belt shaped anode 1.

A cathode 2 was made up in a manner as described below.

Initially, cathode active material was produced in a manner described below.

Lithium carbonate 0.5 mol and cobalt carbonate 1 mol were mixed to heat-treat the mixture for five hours at temperature of 900° C. in air. As the result of the fact that X-ray diffraction measurement has been carried out with respect to the material thus obtained, it has been sufficiently in correspondence with peak of $LiCoO_2$ registered in the JCPDS file.

This $LiCoO_2$ is crushed so that $LiCoO_2$ of which 50% accumulated particle diameter is 15 $\mu$m is provided. Then, the $LiCoO_2$ powder 95 parts by weight and lithium carbonate powder 5 parts by weight were mixed to mix 91 parts by weight of the mixture, graphite 6 parts by weight as a conductive agent and polyvinylidene fluoride 3 parts by weight as binder to prepare cathode depolarizing mix to disperse it into N-methyl pyrolidone so that cathode depolarizing mix slurry (in paste form) is provided.

A belt-shaped aluminum foil having thickness of 20 $\mu$m is used as cathode collector 11 to uniformly paint the cathode depolarizing mix slurry on the both sides of the collector to dry it thereafter to implement compression molding thereto to make up belt-shaped cathode 2.

Then, by stacking the belt-shaped anode 1 and the belt-shaped cathode 2 in order of anode 1, separator 3, cathode 2 and separator 3 through separator consisting of macro porous polypropylene film of thickness of 25 $\mu$m as shown in FIG. 3 thereafter to wind the stacked body many times, a spiral electrode body of outside diameter of 18 mm was made up.

The spiral electrode body made up in this way was accommodated into an iron battery can 5 to which nickel plating is implemented. Then, insulating plates 4 were arranged on the spiral electrode upper and lower both surfaces. An aluminum cathode lead 13 is drawn out from a cathode collector 11 and is welded to a battery cap 7, and an nickel anode lead 12 is drawn out from an anode collector 10 and is welded to the battery can 5.

A non-aqueous electrolyte in which $LiPF_6$ is dissolved in a ratio of 1 mol/l in equal volume mixed solvent of EC and DEC was injected into the battery can 5. Then, the battery can 5 is caulked through an insulating sealed gasket 6 of which surface is coated by asphalt to fix a safety valve unit 8 having a current interrupting mechanism, a PTC element 9 and the battery cap 7 to hold air-tightness within the battery thus to make up a cylindrical non-aqueous electrolyte secondary battery of diameter of 18 mm and height of 65 mm.

Embodiment 2

A method of preparing graphite sample powder obtained from the graphitized molding material used in this embodiment is indicated below.

First, 30 parts by weight of coal tar system pitch serving as binder is added to coal system coke 100 parts by weight serving as filler to mix them at about 100° C. thereafter to compression-mold it by press, thus to obtain precursor of carbon molding material. A pitch impregnation/baking process to further impregnate binder pitch molten at less than 200° C. into the carbon molding material obtained by allowing the precursor to undergo heat treatment at less than 1000° C. is repeated several times thereafter to allow the carbon molding material to undergo heat treatment at 2600° C. under inactive gas atmosphere to obtain the graphitized molding material thereafter to crush and classify it thus to make up graphite material powder of sample.

A cylindrical non-aqueous electrolyte secondary battery having diameter of 18 mm and height of 65 mm was made up similarly to the embodiment 1 except that this graphitized material powder is used as the anode material. True density, bulk density, average shape parameter $x_{ave}$, specific surface area, average particle diameter, grain size distribution, capacity and capacity loss of the graphite material powder are shown in the Table 1 (A–C) and Table 2(A–C)

Embodiment 3

Altered pitch obtained by oxidizing material pitch to allow it to undergo heat treatment at 600° C. or less was compression-molded by press thus to obtain precursor of the carbon molding material. Graphite sample powder was made up similarly to the embodiment 2 except that the above-mentioned precursor is used. Moreover, a cylindrical non-aqueous electrolyte secondary battery similar to the embodiment 1 was made up. True density, bulk density, average shape parameter $x_{ave}$ specific surface area, average particle diameter, grain size distribution, capacity and capacity loss of graphite material powder are shown in the Table 1 and the Table 2.

Embodiment 4

Graphite sample powder was made up similarly to the embodiment except that 40 parts by weight of coal tar system pitch serving as binder is added to coal system coke 100 parts by weight serving as filler. Moreover, a cylindrical non-aqueous electrolyte secondary battery similar to the embodiment 1 was made up. True density, bulk density, average shape parameter $x_{ave}$, specific surface area, average particle diameter, grain size distribution, capacity and capacity loss of graphite material powder are shown in the Table 1 and the Table 2.

Embodiment 5

Graphite sample powder was made up similarly to the embodiment 2 except that coal system coke serving as filler is used. Moreover, a cylindrical non aqueous electrolytes secondary battery similar to the embodiment 1 was made up. True density, bulk density, average shape parameter $x_{ave}$ specific surface area, average particle diameter, grain size distribution, capacity and capacity loss of graphite material powder are shown in the Table 1 and the Table 2.

Embodiment 6

Graphite sample powder was made up similarly to the embodiment 2 except that the graphitized molding material is caused to undergo heat treatment at a temperature of 2700° C. Moreover, a cylindrical non-aqueous electrolyte secondary battery similar to the embodiment 1 was made up. True density, bulk density, average shape parameter $x_{ave}$ specific surface area, average particle diameter, grain size distribution, capacity, and capacity loss of graphite material powder are shown in the Table 1 and the Table 2.

Embodiment 7

A cylindrical non-aqueous electrolyte secondary battery similar to the embodiment 1 was made up except that crushed graphite material by (Ronza) company, Trade Name KS-75 is used as graphite material powder. True density, bulk density, average shape parameter $x_{ave}$, specific surface area, average particle diameter, grain size distribution, capacity, and capacity loss of graphite material powder are shown in the Table 1 and the Table 2.

Embodiment 8

A cylindrical non-aqueous electrolyte secondary battery was made up similarly to the embodiment 1 except that crushed graphite material by (Ronza) company, Trade Name KS-44 is used as graphite material powder. True density, average particle diameter, bulk density, average shape parameter $x_{ave}$, capacity, and capacity loss of the used graphite material powder are shown in the Table 1 and the Table 2.

COMPARATIVE EXAMPLE 1

A cylindrical non-aqueous electrolyte secondary battery was made up similarly to the embodiment 1 except that graphite material by (Ronza) company, Trade Name KS-15 is used as the graphite material powder. True density, average particle diameter, bulk density, average shape parameter $x_{ave}$, capacity, and capacity loss of the used graphite material powder are shown in the Table 1-and the Table 2.

COMPARATIVE EXAMPLE 2

A cylindrical non-aqueous electrolyte secondary battery was made up similarly to the embodiment 1 except that natural graphite material by Nippon Graphite Industry Company, Trade Name CSP-E is used as the graphite material powder. True density, average particle diameter, bulk density, average shape parameter $x_{ave}$, capacity, and capacity loss of the used graphite material powder are shown in the Table 1 and the Table. 2.

COMPARATIVE EXAMPLE 3

Graphite sample material was made up similarly to the embodiment 4 except that, in crushing the graphitized molding material of the embodiment 4, crushing is made in a manner to take a time twice greater than that of the embodiment 4. True density, average particle diameter, bulk density, average shape parameter $x_{ave}$, capacity, and capacity loss of the used graphite material powder are shown in the Table 1 and the Table 2.

COMPARATIVE EXAMPLE 4

A cylindrical non-aqueous electrolyte secondary battery similar to the embodiment 1 was made up except that methocarbon micro beads (MCMB) which has been subjected to heat treatment at 3000° C. in the inactive gas atmosphere. True density, average particle diameter, bulk density, average shape parameter $x_{ave}$, capacity, and capacity loss of the graphite material powder are shown in the Table 1 and the Table 2.

A cylindrical non-aqueous electrolyte secondary battery similar to the embodiment 1 was made up except that methocarbon micro beads (MCMB-25-28) which has been subjected to heat treatment at 2800° C. in the inactive gas atmosphere. True density, average particle diameter, bulk density, average shape parameter $x_{ave}$, capacity, and capacity loss of the graphite material powder are shown in the Tables 1A, 1B, 1C, 2A, 2B, and 2C.

TABLE 1A

| | TRUE DENSITY g/cm³ | BULK SPECIFIC GRAVITY g/cm³ | AVERAGE SHAPE PARAMETER | SPECIFIC SURFACE AREA m²/g | AVERAGE PARTICLE DIAMETER μm |
|---|---|---|---|---|---|
| EMBODIMENT 1 | 2.20 | 1.18 | 3.6 | 1.3 | 33.4 |
| EMBODIMENT 2 | 2.23 | 0.83 | 10 | 4.4 | 31.2 |
| EMBODIMENT 3 | 2.16 | 1.05 | 8 | 3.8 | 46.8 |
| EMBODIMENT 4 | 2.21 | 0.57 | 25 | 6.2 | 16.7 |

TABLE 1B

| | TRUE DENSITY g/cm³ | BULK SPECIFIC GRAVITY g/cm³ | AVERAGE SHAPE PARAMETER | SPECIFIC SURFACE AREA m²/g | AVERAGE PARTICLE DIAMETER μm |
|---|---|---|---|---|---|
| EMBODIMENT 5 | 2.20 | 0.82 | 5 | 4.5 | 27.3 |
| EMBODIMENT 6 | 2.13 | 1.02 | 12 | 2.9 | 52.0 |
| EMBODIMENT 7 | 2.23 | 0.50 | 97 | 6.6 | 35.3 |
| EMBODIMENT 8 | 2.23 | 0.41 | 115 | 8.5 | 21.4 |

TABLE 1C

| | TRUE DENSITY g/cm³ | BULK SPECIFIC GRAVITY g/cm³ | AVERAGE SHAPE PARAMETER | SPECIFIC SURFACE AREA m²/g | AVERAGE PARTICLE DIAMETER μm |
|---|---|---|---|---|---|
| COMPARATIVE EXAMPLE 1 | 2.28 | 0.33 | 127 | 11.9 | 9.0 |

TABLE 1C-continued

| | TRUE DENSITY g/cm³ | BULK SPECIFIC GRAVITY g/cm³ | AVERAGE SHAPE PARAMETER | SPECIFIC SURFACE AREA m²/g | AVERAGE PARTICLE DIAMETER μm |
|---|---|---|---|---|---|
| COMPARATIVE EXAMPLE 2 | 2.28 | 0.23 | 140 | 12.7 | 11.8 |
| COMPARATIVE EXAMPLE 3 | 2.30 | 0.33 | 106 | 13.7 | 11.4 |
| COMPARATIVE EXAMPLE 4 | 2.17 | 1.15 | 1.0 | 2.6 | 6.2 |
| COMPARATIVE EXAMPLE 5 | 2.19 | 1.24 | 1.8 | 1.3 | 28.2 |

TABLE 2A

| | ACCUMULATED 10% PARTICLE DIAMETER μm | ACCUMULATED 50% PARTICLE DIAMETER μm | ACCUMULATED 90% PARTICLE DIAMETER μm | CAPACITY mAh/g | CAPACITY LOSS mAh/g |
|---|---|---|---|---|---|
| EMBODIMENT 1 | 11.8 | 29.5 | 64.0 | 302 | 30 |
| EMBODIMENT 2 | 12.3 | 29.5 | 53.7 | 300 | 35 |
| EMBODIMENT 3 | 22.0 | 44.4 | 81.8 | 300 | 30 |
| EMBODIMENT 4 | 6.5 | 15.8 | 30.8 | 303 | 38 |

TABLE 2B

| | ACCUMULATED 10% PARTICLE DIAMETER μm | ACCUMULATED 50% PARTICLE DIAMETER μm | ACCUMULATED 90% PARTICLE DIAMETER μm | CAPACITY mAh/g | CAPACITY LOSS mAh/g |
|---|---|---|---|---|---|
| EMBODIMENT 5 | 11.3 | 25.5 | 46.2 | 317 | 40 |
| EMBODIMENT 6 | 31.3 | 50.3 | 80.9 | 300 | 31 |
| EMBODIMENT 7 | 6.8 | 27.6 | 84.9 | 344 | 53 |
| EMBODIMENT 8 | 6.1 | 19.8 | 81.8 | 335 | 63 |

TABLE 2C

| | ACCUMULATED 10% PARTICLE DIAMETER μm | ACCUMULATED 50% PARTICLE DIAMETER μm | ACCUMULATED 90% PARTICLE DIAMETER μm | CAPACITY mAh/g | CAPACITY LOSS mAh/g |
|---|---|---|---|---|---|
| COMPARATIVE EXAMPLE 1 | 3.3 | 8.2 | 16.4 | 330 | 65 |
| COMPARATIVE EXAMPLE 2 | 4.1 | 9.7 | 23.8 | 336 | 92 |
| COMPARATIVE EXAMPLE 3 | 2.5 | 9.6 | 26.3 | 300 | 50 |
| COMPARATIVE EXAMPLE 4 | 2.7 | 5.8 | 10.6 | 281 | 37 |
| COMPARATIVE EXAMPLE 5 | 10.6 | 25.9 | 50.4 | 252 | 32 |

With respect to the batteries made up in this way, constant current constant voltage charge operation was first carried out at charge current 1 A and maximum charge voltage 4.2 V for 2.5 hours. Thereafter, those batteries were left in that open circuit state to measure battery voltages after 12 hours to consider batteries of which voltage drop is great to be defective articles to calculate initial charge failure rate with respect to total number of batteries. Initial charge failure rates in respective embodiment batteries are shown in the Table 3.

As a result, according as the accumulated 50% particle diameter in the grain size distribution becomes greater, occurrence rate of the initial failure became higher and according as the accumulated 90% particle diameter becomes greater, the occurrence rate thereof further became higher.

It is considered that the above-mentioned initial failure results from the fact that when the battery is charged, lithium ions intercalated in graphite layers and the electrode is therefore swollen, so the swollen portion presses the cathode or the separator within the battery so that internal short takes place. In batteries industrially made up, the anode material may slip off from the electrode or uneven portions are apt to be perceived on the surface of the electrode. In such a case, with respect to graphite powder of greater particle diameter, internal short is apt to occur to more degree and initial failure is apt to take place to more degree.

From facts as above, it is seen that, in order to obtain practical batteries having high reliability, in the graphite material powder, it is required that the accumulated 90% particle diameter in the grain size distribution by the laser diffraction method is 70 μm or less.

Thereafter, batteries except for defective articles were used to repeatedly carry out charge/discharge cycle to determine ratio of capacity of the 100-th cycle with respect to the capacity of 2-nd cycle (capacity ratio). With respect to the cycle test, 2.5 hour charge operation was carried at the maximum charge voltage 4.2 V and the charge current 1 A to carry out discharge operation up to 2.75 V at a constant current of 700 mA. The (battery) capacity of the second cycle and the capacity ratio of the 100-th cycle with respect to the capacity of the 2-nd cycle are shown in the Table 3.

TABLE 3

| | FAILURE RATE AFTER INITIAL CHARGE % | BATTERY CAPA-CITY OF 2-ND CYCLE mAh/g | CAPACITY RATIO % |
|---|---|---|---|
| EMBODIMENT 1 | 1 | 1471 | 90 |
| EMBODIMENT 2 | 0 | 1470 | 88 |
| EMBODIMENT 3 | 10 | 1485 | 87 |
| EMBODIMENT 4 | 0 | 1465 | 62 |
| EMBODIMENT 5 | 0 | 1493 | 88 |
| EMBODIMENT 6 | 8 | 1470 | 85 |
| EMBODIMENT 7 | 15 | 1482 | 71 |
| EMBODIMENT 8 | 0 | 1478 | 60 |

Figure 4:
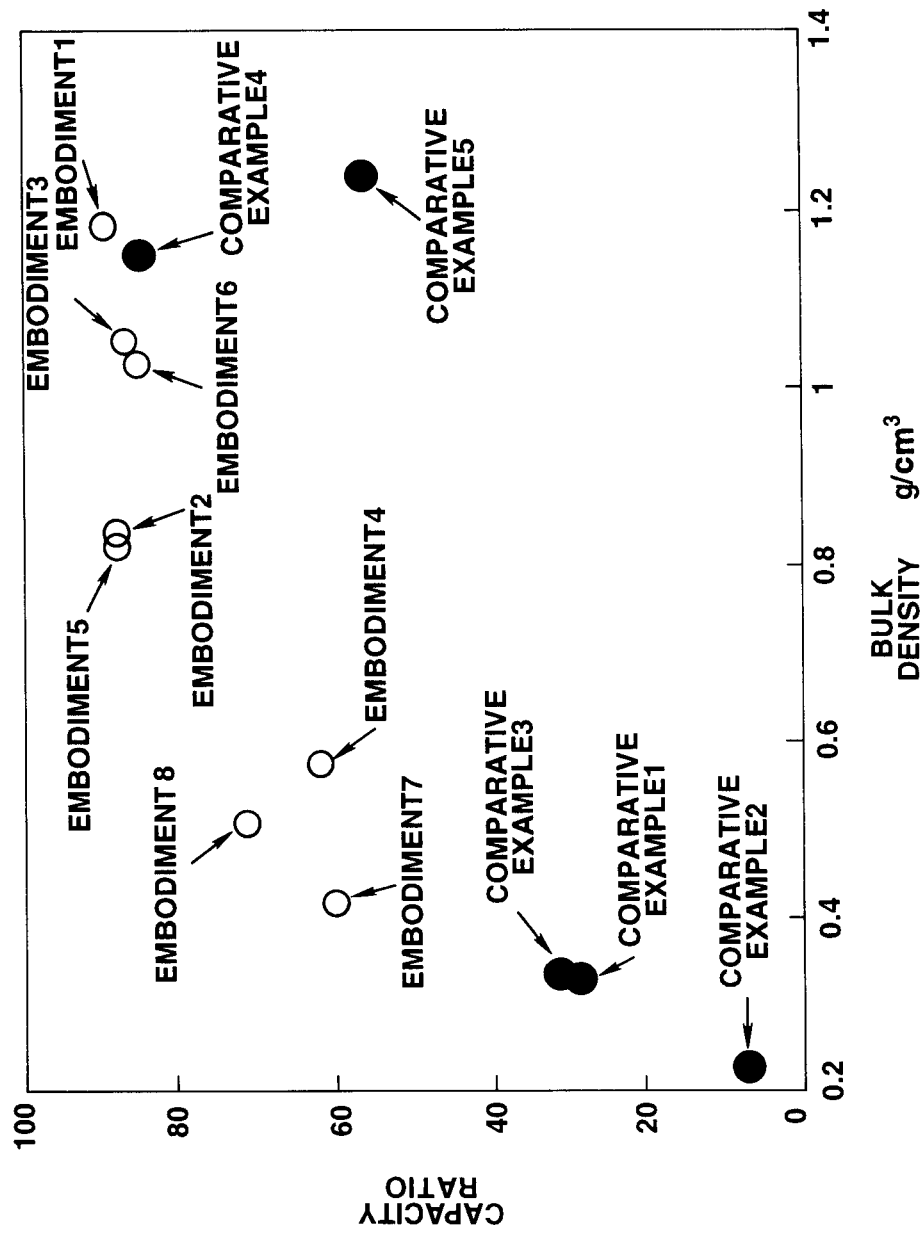
FIG. 4 is a characteristic diagram showing the relationship between bulk density of graphite material powder and capacity ratio of battery.
Figure 5:
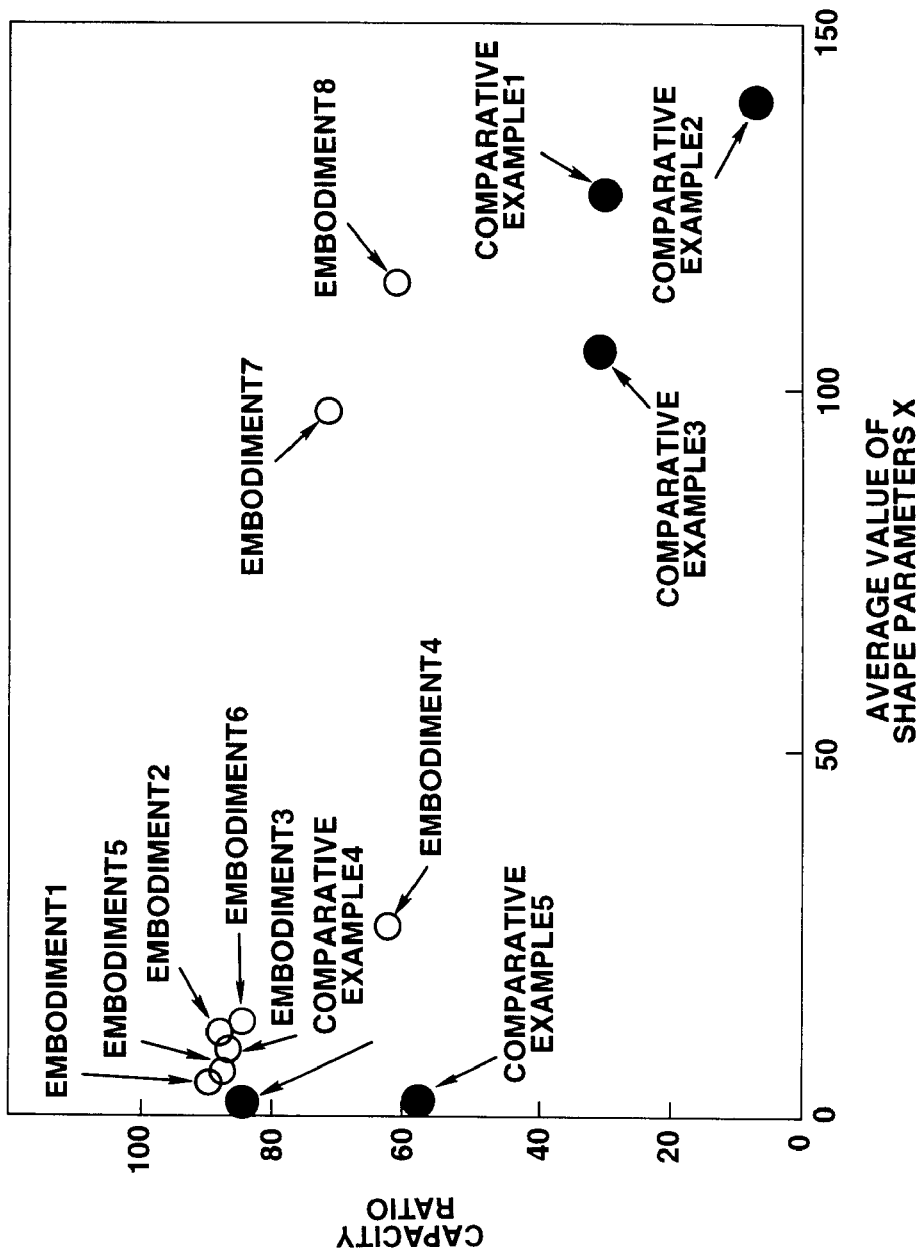
FIG. 5 is a characteristic diagram showing the relationship between average shape parameter $x_{ave}$ of graphite material powder and capacity ratio of battery.
Figure 6:
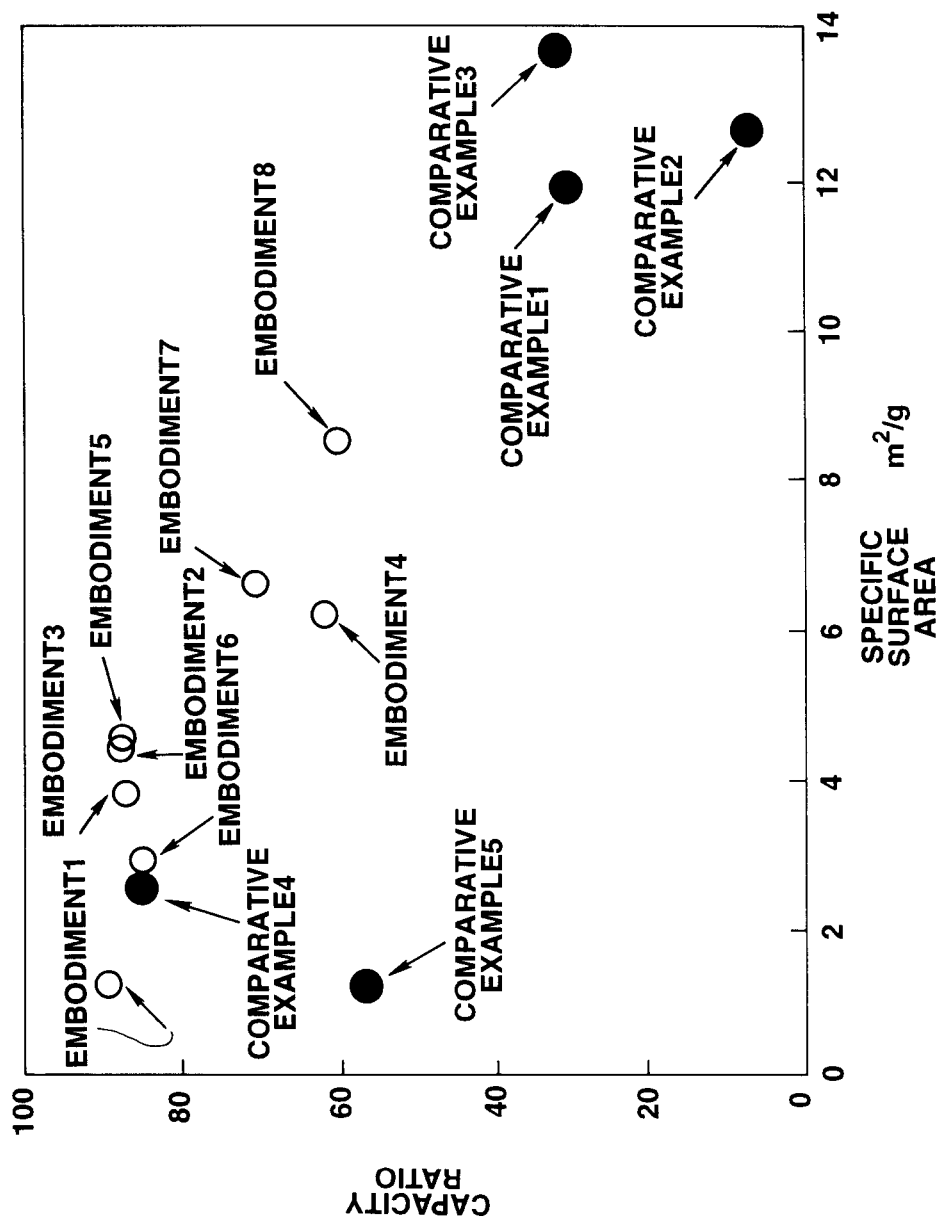
FIG. 6 is a characteristic diagram showing the relationship between specific surface area of graphite material powder and capacity ratio of battery.

Moreover, bulk density, average shape parameter $x_{ave}$, and specific surface area of graphite material used as the anode material are respectively taken on the abscissa, and capacity ratio are plotted on the ordinate to respectively show, in FIGS. 4, 5 and 6, the relationship of the capacity ratio with respect to the bulk density of graphite sample powder, the relationship of the capacity ratio with respect to the average shape parameter $x_{ave}$ of the graphite sample powder, and the relationship of the capacity ratio with respect to the specific surface area of the graphite sample powder.

As seen from FIGS. 4, 5, 6, the capacity ratio of the battery changes in dependency upon the bulk density, the average shape parameter $x_{ave}$ and the specific surface area of the graphite material powder. Namely, according as the bulk density of the graphite material powder becomes greater, according as the average shape parameter $x_{ave}$ becomes smaller, and according as the specific surface area becomes smaller, the capacity ratio of the battery increases to more degree.

From facts as above, it is seen that the capacity ratio of the battery can be controlled by the bulk density, the average shape parameter $x_{ave}$ and the specific surface area of the graphite material powder used as the anode. Further, from FIGS. 4, 5, 6, it is seen that it is necessary for obtaining batteries having great capacity ratio and excellent in the cycle characteristic to make a limitation such that the bulk density of the graphite material powder is 0.4 g/cm$^3$ or more, the average shape parameter $x_{ave}$ thereof is 125 or less, and the specific surface area is 9 m$^2$/g thereof or less.

In addition, after initial charge is carried out, batteries except for defective articles were used to conduct overcharge test to measure maximum temperatures in respective batteries. The overcharge test was conducted under the condition where the upper limit voltage is not provided and the current is set to constant current of 3 A.

It is to be noted that, in cylindrical non-aqueous electrolyte secondary batteries used in the embodiments and the comparative examples, there is incorporated thereinto a function such that when lithium carbonate is decomposed with elevation of the battery voltage by the action of lithium carbonate added to the anode material so that carbonic acid gas is produced, a pressure responsive type safety valve unit for interrupting current provided within the battery becomes operative to maintain safety. However, in the case where the maximum temperature is high, extraordinary reaction takes place, and temperature further rises, resulting in the state where the battery is relatively rapidly broken.

The result of the overcharge test is shown in the Table 4.

TABLE 4

| | MAX. TEMPERATURE AT TIME OF OVERCHARGE TEST |
|---|---|
| EMBODIMENT 1 | 50 |
| EMBODIMENT 2 | 48 |
| EMBODIMENT 3 | 47 |
| EMBODIMENT 4 | 62 |
| EMBODIMENT 5 | 60 |
| EMBODIMENT 6 | 50 |
| EMBODIMENT 7 | 59 |
| EMBODIMENT 8 | 62 |
| COMPARATIVE EXAMPLE 1 | 68 |
| COMPARATIVE EXAMPLE 2 | 65 |
| COMPARATIVE EXAMPLE 3 | 63 |
| COMPARATIVE EXAMPLE 4 | 75 |
| COMPARATIVE EXAMPLE 5 | 51 |

As a result, with respect to all batteries, the safety valve units for interrupting current became operative. Thus, safety was maintained. In this case, according as the accumulated 50% particle diameter in the grain size distribution becomes smaller, the maximum temperature at the time of overcharge becomes higher, and according as the accumulated 10% particle diameter becomes smaller, the maximum temperature further became higher.

From facts as described above, it is seen that, in order to obtain higher safety non-aqueous electrolyte secondary batteries, in the graphite material powder, it is necessary that the accumulated 50% particle diameter in the grain size distribution determined by the laser diffraction method is 10 μm or more, and the accumulated 10% particle diameter therein is 3 μm or more.

Then, an average value of particle breaking strength (hereinafter referred to as "average particle breaking strength") of graphite material powder samples used in the embodiments 1 to 8 was measured. The measurement was carried out by the following method.

[Measurement Method for Average Particle Breaking Strength]

As a measurement device for breaking strength, a Shimazu Seisakusho Shimazu Micro Compression Testing Machine (MCTM-500) is used. First, graphite material powder samples were measured by an optical microscope provided in association therewith to select ten (10) powder samples such that length of the portion in which length is the longest is ±10% of the average particle diameter. Then, weight is applied to the respective selected ten (10) powder samples to measure particle breaking strength to calculate its average value. This calculated average value is caused to be an average particle breaking strength of the graphite material powder.

The average particle breaking strength values of graphite material powder samples used in the embodiments 1 to 8 are shown in the Table 5. Further, porosity of electrodes using respective graphite material powder samples as the anode material were measured to assume the value obtained in the embodiment 1 to be 100% to indicate their rates with respect to the embodiments 1 to 8.

In addition, after initial charging is carried out, batteries of the embodiments except for defective were used to discharge large current after charging to evaluate drain capability. The test condition is as follows. Namely, charge operation of 2.5 hours was carried out under the condition of the maximum charge voltage 4.2 V and the charge current 1 A, and discharge operation was conducted at a constant current of 4.5 A until the voltage reaches 2.75 V. Discharge capacity at this time and capacity ratio of 4.5 A discharge with respect to capacity of the 2-nd cycle are shown in the Tables 5A and 5B.

| | AVERAGE VALUE OF PARTICLE BREAKING STRENGTH (kgf/mm²) N/mm² | POROSITY % | 4.5 A DISCHARGE CAPACITY mAh/g | CAPACITY RATIO % |
|---|---|---|---|---|
| EMBODIMENT 1 | (7.8) 76.5 | 100 | 418 | 28.4 |
| EMBODIMENT 2 | (7.1) 69.6 | 97 | 422 | 28.7 |
| EMBODIMENT 3 | (4.5) 44.1 | 80 | 402 | 27.1 |
| EMBODIMENT 4 | (9.1) 89.3 | 103 | 432 | 29.5 |

| | AVERAGE VALUE OF PARTICLE BREAKING STRENGTH (kgf/mm²) N/mm² | POROSITY % | 4.5 A DISCHARGE CAPACITY mAh/g | CAPACITY RATIO % |
|---|---|---|---|---|
| EMBODIMENT [1]5 | (6.0) 58.9 | 90 | 431 | 28.9 |
| EMBODIMENT [2]6 | (6.5) 63.8 | 95 | 424 | 28.8 |
| EMBODIMENT [3]7 | (5.5) 54.0 | 74 | 387 | 26.0 |
| EMBODIMENT [4]8 | (5.8) 56.9 | 78 | 392 | 26.5 |

As a result, according as the average particle breaking strength becomes higher, the electrode porosity became higher, and the drain capability was also satisfactory. For example, in the case where the electrode is compression-molded by constant pressure, according as the breaking strength of particle becomes higher, electrode becomes difficult to be collapsed. For this reason, a larger number of voids would exist within the electrode. Moreover, easiness of movement of ions at the time of discharge affects the drain capability. In the case where a large number of voids exist within the electrode, a satisfactory characteristic is exhibited because a sufficient quantity of non-aqueous electrolyte exists. Accordingly, in order to obtain a satisfactory drain capability, it is necessary that the average particle breaking strength is 6.0 Kg f/mm² or more.

Particularly, graphitized powder obtained by crushing and classifying the graphitized molding material exhibits excellent drain capability also in these embodiments. It is thus seen that the drain capability can be further improved in non-aqueous electrolyte secondary batteries using such graphitized powder as the anode material.

Meanwhile, methocarbon micro beads (MCMB) take a, form substantially close to complete round, and indicate high bulk density and the lowest average shape parameter $x_{ave}$. However, since a thin graphite layer which is isotropic and has low activity from an electrochemical point of view is covered on the particle surface, lithium doping/undoping reaction is difficult to be developed. The graphite material powder used in the comparative example 5 has large particle diameter and indicates excellent values in both the bulk density and the average shape parameter $x_{ave}$. However, since its surface is covered with a layer in which reaction is difficult to be developed, substantial reaction area is small and capacity is also small. On the other hand, the graphite material powder used in the comparative example 4 indicates excellent values in both the bulk density and the average shape parameter $x_{ave}$, and the substantial reaction area is broad because the particle diameter is small, so capacity is increased. However, since the fact that particle diameter is small constitutes obstacle, the maximum temperature becomes the highest in the overcharge test, thus making it difficult to maintain safety.

What is claimed is:

1. A non-aqueous electrolyte secondary battery, comprising:
    (a) an anode consisting of carbon material in which doping/undoping of lithium is permitted, the anode including a binder,
    (b) a cathode having a binder,
    (c) a non-aqueous electrolyte in which electrolyte is dissolved in a non-aqueous solvent,
    (d) wherein the carbon material constituting the anode is graphite material having true density of 2.1 g/cm³ or more, the graphite material being crushed powder having non-spherical shape in which an average value of shape parameters each indicated by the following expression is 125 or less:

$$x=(L/T)\cdot(W/T)$$

x: shape parameter
    T: thickness of the portion thinnest in thickness of the powder
    L: length in a length axis direction of the powder
    W: length in a direction perpendicular to the length axis of the powder; and
    (e) wherein the material further comprises at least one of a B, Na, Al, S, N, Ca, V, and Si, in a quantity sufficient to obtain a higher hardness;
    (f) wherein at least one of the anode binder and cathode binder comprises polyvinylidene fluoride; and
    (g) wherein the graphite material is such that, in the grain size distribution determined by the laser diffraction method, the accumulated 10% particle diameter is 3 μm or more, the accumulated 50% particle diameter is 10 μm or more, and the accumulated 90% particle diameter is 70 μm or more.

2. A non-aqueous electrolyte secondary battery as set forth in claim 1, wherein the graphite material is obtained by crushing the graphitized molding material obtained by allowing a carbon molding material to undergo heat treatment so that it is graphitized.

3. A non-aqueous electrolyte secondary battery as set forth in claim 1, wherein the graphite material is powder having a specific surface area of 9 m²/g or less.

4. A non-aqueous electrolyte secondary battery as set forth in claim 1, wherein the graphite material is such that an average value of particle breaking strength is 58.84 N/mm² (6.0 Kg f/mm²) or more.

5. A non-aqueous electrolyte secondary battery as set forth in claim 1, wherein the cathode consists of lithium transition metal compound oxide expressed by general expression $LiMO_2$, wherein M comprises at least one of Co, Ni, Mn, Fe, Al, V and Ti, and the non-aqueous electrolyte is the solution in which lithium salt is dissolved in a non-aqueous solvent including at least one of cyclic carbonic ester and chain carbonic ester.

6. A non-aqueous electrolyte secondary battery, comprising:
   (a) an anode consisting of carbon material in which doping/undoping of lithium is permitted, the anode including a binder,
   (b) a cathode having a binder,
   (c) a non-aqueous electrolyte in which electrolyte is dissolved in a non-aqueous solvent,
   (d) wherein the carbon material constituting the anode is graphite material having true density of 2.1 g/cm$^3$ or more, the graphite material being crushed powder having non-spherical shape in which an average value of shape parameters each indicated by the following expression is 125 or less:

$$x=(L/T)\cdot(W/T)$$

x: shape parameter
   T: thickness of the portion thinnest in thickness of the powder
   L: length in a length axis direction of the powder
   W: length in a direction perpendicular to the length axis of the powder;
      wherein the graphite material has a composition of 10% particle diameter is 3 μm or more, 50% particle diameter is 10 μm or more, and 90% particle diameter is 70 μm or more;
   (e) wherein the material further comprises at least one of a B, Na, Al, S, N, Ca, V, and Si, in a quantity sufficient to obtain a higher hardness;
   (f) wherein the anode includes Li corresponding to a charge/discharge capacity of 250 mAh or more per 1 g of graphite material of the anode; and
   (g) wherein at least one of the anode binder and cathode binder comprises polyvinylidene fluoride.

7. The non-aqueous electrolyte secondary battery of claim 6, wherein the graphite material is obtained by crushing the graphitized molding material obtained by allowing a carbon molding material to undergo heat treatment so that it is graphitized and wherein the graphite material is powder having a specific surface area of 9 m$^2$/g or less.

8. A non-aqueous electrolyte secondary battery, comprising:
   (a) an anode consisting of carbon material in which doping/undoping of lithium is permitted, the anode including a binder,
   (b) a cathode including a binder,
   (c) a non-aqueous electrolyte in which electrolyte is dissolved in a non-aqueous solvent,
   (d) wherein the carbon material constituting the anode is graphite material having true density of 2.1 g/cm$^3$ or more, the graphite material being crushed powder having non-spherical shape in which an average value of shape parameters each indicated by the following expression is 125 or less:

$$x=(L/T)\cdot(W/T)$$

x: shape parameter
   T: thickness of the portion thinnest in thickness of the powder
   L: length in a length axis direction of the powder
   W: length in a direction perpendicular to the length axis of the powder;
   (e) wherein the graphite material has a composition of 10% particle diameter is 3 μm or more, 50% particle diameter is 10 μm or more, and 90% particle diameter is 70 μm or more;
   (f) wherein the material further comprises at least one of a B, Na, Al, S, N, Ca, V, and Si, in a quantity sufficient to obtain a higher hardness;
   (g) wherein the anode includes Li corresponding to a charge/discharge capacity of 250 mAh or more per 1 g of graphite material of the anode;
   (h) wherein the graphite material is obtained by crushing the graphitized molding material obtained by allowing a carbon molding material to undergo heat treatment so that it is graphitized and wherein the graphite material is powder having a specific surface area of 9 m$^2$/g or less;
   (i) wherein the graphite material is such that an average value of particle breaking strength is 58.84 N/mm$^2$ (6.0 Kg f/mm$^2$) or more; and
   (j) wherein at least of the anode binder and cathode binder comprises polyvinylidene fluoride.

* * * * *

UNITED STATES PATENT AND TRADEMARK OFFICE
CERTIFICATE OF CORRECTION

PATENT NO. : 6,623,888 B1
DATED : September 23, 2003
INVENTOR(S) : Atsuo Omaru et al.

It is certified that error appears in the above-identified patent and that said Letters Patent is hereby corrected as shown below:

<u>Title page, Item [54] and Column 1, lines 1 and 2,</u>
Title, "NON-AQUEOUS ELECTROLYTE SECONDARY CELL" should be
-- NON-AQUEOUS ELECTROLYTE SECONDARY BATTERY --

Signed and Sealed this

Eleventh Day of May, 2004

JON W. DUDAS
*Acting Director of the United States Patent and Trademark Office*

Disclaimer

6,623,888 — Atsuo Omaru, Fukushima (JP); Naoyuki Nakajima, Fukushima (JP); Masayuki Nagamine, Fukushima (JP). NON-AQUEOUS ELECTROLYTE SECONDARY CELL. Patent dated Sep. 23, 2003. Disclaimer filed Jul. 29, 2005, by the assignee, Sony Corporation.

This patent is subject to a terminal disclaimer.

*(Official Gazette, October 11, 2005)*